(No Model.)
W. GREEN.
JOINT OR COUPLING FOR TUBES, &c.
No. 341,904. Patented May 18, 1886.
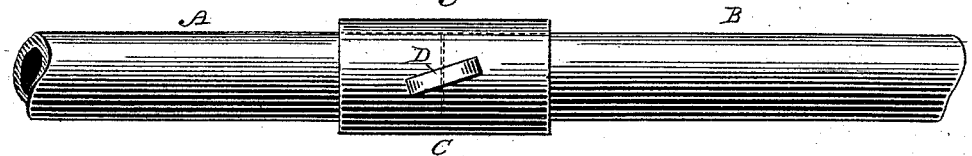
Fig. 1.
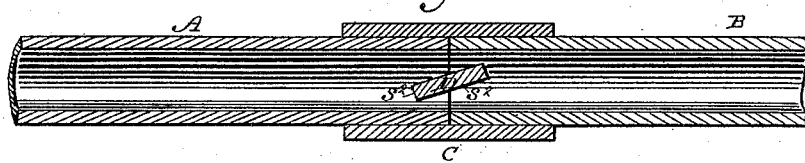
Fig. 2.
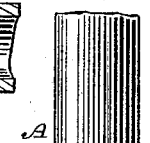
Fig. 5.
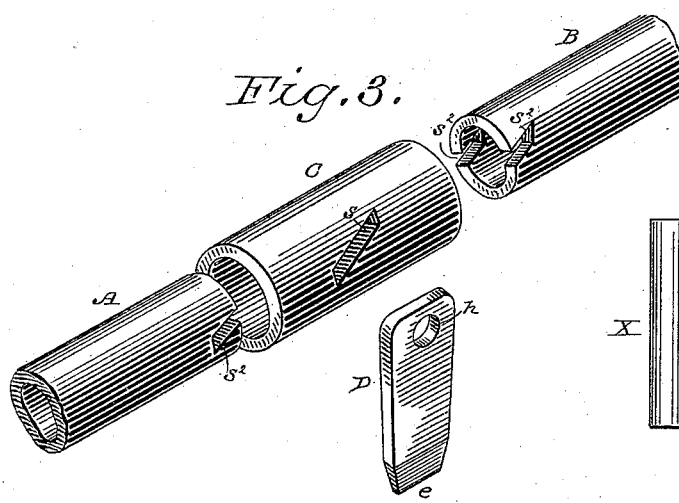
Fig. 3.
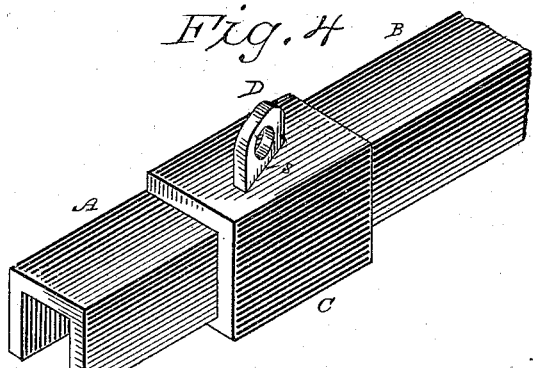
Fig. 4.
Witnesses
Al. C. Newman
Ed. A. Newman
Inventor
WILLIAM GREEN,
By his Attorney

UNITED STATES PATENT OFFICE.

WILLIAM GREEN, OF HYDE, COUNTY OF CHESTER, ENGLAND.

JOINT OR COUPLING FOR TUBES, &c.

SPECIFICATION forming part of Letters Patent No. 341,904, dated May 18, 1886.

Application filed March 13, 1886. Serial No. 195,135. (No model.) Patented in England September 24, 1885, No. 11,365.

*To all whom it may concern:*

Be it known that I, WILLIAM GREEN, a subject of the Queen of Great Britain and Ireland, residing at Hyde, in the county of Chester, England, have invented a new and useful Improvement in Joints or Couplings for Tubes or Rods, (patented in Great Britain and Ireland by Letters Patent No. 11,365, dated September 24, 1885,) of which the following is a specification.

This invention relates to improvements on or substitutes for screw joints or couplings, for tubes used as rods, and for rods proper of any shape in cross-section.

The present invention consists in the combination, with two tube or rod ends to be coupled, of an external "bush" or short tube adapted to slide thereon or on one of them and a transverse "cotter" or key which interlocks the ends within said bush, said key being in the form of a simple flat wedge, and having a slight taper to stop it in its seat when it is driven home, which seat is formed by simple oblique slots in said bush and in the united tube or rod ends, this combination of parts providing for quickly coupling and uncoupling, and for inserting and removing tube or rod lengths laterally, while manufacture and repairs are simplified, as hereinafter set forth.

A sheet of drawings accompanies this specification as part thereof.

Figure 1 of these drawings is an elevation of a tube-coupling illustrating this invention. Fig. 2 represents a longitudinal section thereof, and Fig. 3 is a perspective view of its parts separated. Fig. 4 is a perspective view of a rod-coupling constructed according to the same invention, and Fig. 5 is an elevation of a tube or round rod having two of these improved joints, illustrating some of their advantages.

Like letters of reference indicate corresponding parts in the several figures.

The tube or rod ends A B which are to be coupled have fitted thereto an external bush or short tube, C, and these three members of the joint or coupling are "slotted" to receive a transverse cotter or key, D, which unites said ends within said bush, as aforesaid, so as to resist their separation, as shown in Figs. 1, 2, and 4. Said cotter or key D is constructed in the form of a flat wedge, as best seen in Fig. 3. Its taper may be confined to its edges. Its entering end $e$, Fig. 3, is beveled, to facilitate its insertion, and its larger end is provided with a hole, $h$, to admit a withdrawing-tool. The socket or seat to receive and coact with said cotter or key D is composed of a diagonal or oblique slot, $s$, in said bush C, and half-slots $s^2$ in the tube or rod ends B A, as seen in Fig. 3, which coincide with each other when the extremities of the tube or rod ends abut properly within the bush at mid-length of the latter. The tube or rod ends and bush having been so adjusted, the cotter or key is inserted and driven home, which completes the joint or coupling. After loosening the key by striking its protruding small end or the tube or rod on its opposite side, the key is readily withdrawn by a prying-tool applied to said hole $h$, which permits the tube or rod ends to separate. When the tube or rod ends cannot be readily separated longitudinally, the bush is readily slid upon either tube or rod end, so as to permit a tube or rod section, X, to be taken out laterally, as represented in Fig. 5. Sections may be inserted laterally in like manner with the utmost facility.

With tubing or rods of a given section either end may couple equally well with any other within any bush. Said construction of socket or key-seat which provides for this provides, also, for most readily making the parts and for improvising or repairing, as aforesaid.

Having thus described my said improvement in joints or couplings for tubes or rods, I claim as my invention and desire to patent under this specification—

The combination of a cotter or key in the form of a flat wedge, a bush or short tube having a diagonal or oblique slot at mid-length, and two tube or rod ends having half-slots in their abutting extremities which coincide with said slot in said bush to receive said key, substantially as herein specified, for the purposes set forth.

In testimony whereof I affix my signature in the presence of two witnesses.

WILLIAM GREEN.

Witnesses:
 JOHN G. WILSON,
 JOHN SLATER.